United States Patent [19]

Hart

[11] 4,358,729
[45] Nov. 9, 1982

[54] THYRISTOR DRIVER CONTROLLER FOR REACTIVE LOADS AND METHOD OF OPERATION THEREOF

[75] Inventor: Patrick J. Hart, Johnson City, Tenn.

[73] Assignee: Texas Instruments Incorporated, Dallas, Tex.

[21] Appl. No.: 175,169

[22] Filed: Aug. 4, 1980

[51] Int. Cl.³ ................................................ H02J 1/00
[52] U.S. Cl. .................................... 323/322; 323/241
[58] Field of Search ............................... 307/252 UA; 219/10.55 B, 10.75; 323/235, 237, 241, 319, 320, 322

[56] References Cited

U.S. PATENT DOCUMENTS

| | | | |
|---|---|---|---|
| 3,486,042 | 12/1969 | Watrous | 307/252 UA |
| 3,633,095 | 1/1972 | Hood | 323/319 |
| 3,743,860 | 7/1973 | Rossell | 307/252 UA |

*Primary Examiner*—William M. Shoop
*Attorney, Agent, or Firm*—James P. McAndrews; John A. Haug; Melvin Sharp

[57] ABSTRACT

Disclosed is a method and circuit for automatically adjusting the firing angle of a switching element, such as a thyristor or triac, to minimize surge currents produced in reactive loads in AC power applications. A typical application would be in a microwave oven controller when the circuit would be used as an interface between the microwave oven control circuitry and the thyristor driving a magnetron. The circuit is comprised of a digital-control, phase-locked loop oscillator which produces a series of triggering pulses which are synchronized with the AC line voltage; the oscillator oscillates at a known frequency and clocks a counter during one half-cycle of the line voltage, resetting the counter during the opposite half-cycle. A peak fire detection circuit is coupled to the oscillator. An enable signal is generated by the microwave oven control circuitry. Since the oscillator frequency is known, the AC line voltage peak occurs at a known state of the counter. This count is decoded in the peak fire circuit and when the circuit is enabled by the microwave oven control circuitry, an initial trigger pulse is applied to the gate of the thyristor, turning it on. After the thyristor is initially fired under peak fire control, the retriggering is controlled by a zero fire circuit which detects zero current crossings (zero current) through the triac.

The triac will enter its non-conductive state when the main terminal current is less than the specified holding current of the device. When the triac is in the non-conductive state, the main terminal voltage will be the AC line voltage. The disclosed circuit will generate a retriggering pulse when the main terminal voltage reaches a predetermined magnitude. This method of generating trigger pulses is used in all subsequent cycles.

10 Claims, 7 Drawing Figures

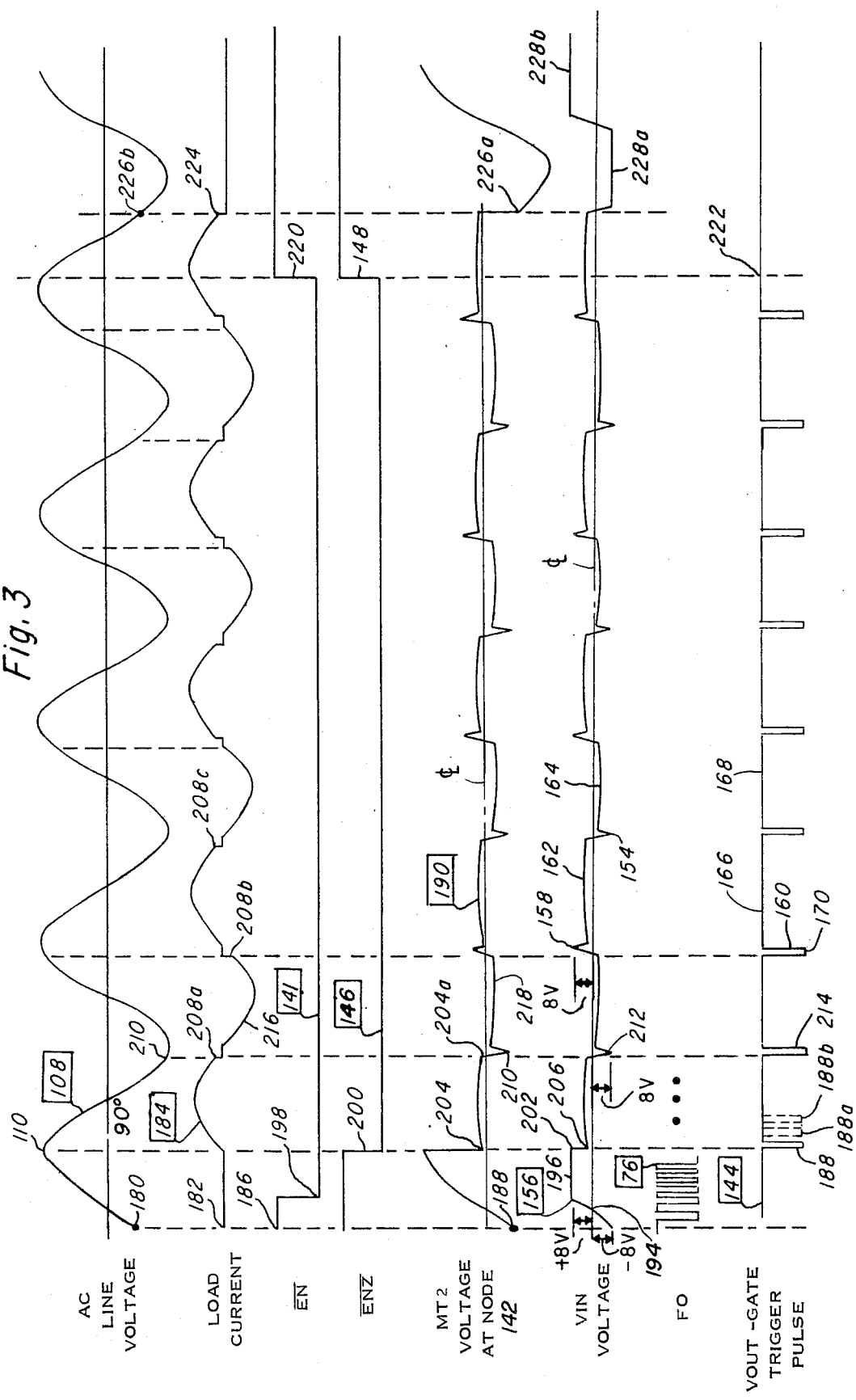

THYRISTOR DRIVER CONTROLLER FOR REACTIVE LOADS AND METHOD OF OPERATION THEREOF

This invention relates to reducing unwanted surge currents in AC circuits, and more particularly to a method and apparatus for automatically adjusting the firing angle of a thyristor to minimize surge currents produced in reactive loads.

Solid state control of AC power using the integral-cycle technique is known in the art and requires a series connected switching device, such as a thyristor, to conduct and cause current to flow through a load for a predetermined number of integral cycles and thereafter cease conduction for a predetermined number of cycles. The technique of alternately producing conduction and non-conduction results in the desired control of AC power. This is to be contrasted with phase control of a thyristor which conducts in every line cycle but the conduction period is varied for each cycle to achieve the desired control of AC power. Integral-cycle control is preferable over phase control in that RF interference is reduced.

For purely resistive loads, the conduction of a thyristor is initiated at a voltage zero crossing, resulting in a current initiation at a zero crossing as well. For inductive loads, if the conduction is not initiated at the correct point in the voltage waveform, a large DC offset (surge current) results in the load current which can be many times greater than the currents which flow under steady-state conditions. Surge currents may degrade the reliability of a system or force the selection of components with higher ratings (and prices) in order to avoid early fatigue failure. If surge currents are minimized, a system can be fuse-protected at a current much closer to the expected normal system current.

Thyristors subjected to current surges deteriorate and finally fail due to the rapid cyclical heating and overheating and overheating of the thyristor chips. The cycling produces differential expansion and contractions of the chip which loosens it from the substrate.

Furthermore, surge currents can generate large mechanical forces among windings of an inductive load (for example, a motor or the transformer windings associated with a magnetron); conductors can be strained and insulation between conductors can become compressed and damaged. Current surges produce generation of large magnetostrictive forces in ferromagnetic material which can move laminations, shunts and anchoring devices to eventually cause failure or produce unacceptable audible noise. High surge currents also can create electrical-noise spikes and electromagnetic interference which create problems in sensitive electronic equipment.

For purely reactive loads, the minimum surge current will flow if the switching element thyristor is turned on at the peak of the AC line voltage waveform ($\theta = 90°$ or $270°$). Maximum surge current appears if the thyristor switch is closed at the zero voltage crossing points of the AC line voltage ($\theta = 0°$ or $180°$). For practical loads which are not purely reactive (i.e., there is some resistive component), the minimum surge current will be drawn when conduction is initiated at some angle near $90°$ or $270°$ determined by $\theta = \tan^{-1}(WL/R)$ for a series RL circuit. It is desirable, therefore, to switch the load current "on" at or near the AC line voltage peak.

One prior art method of accomplishing this peak-fire turn-on is to determine the peak of the line voltage with a microcomputer program and to buffer the microcomputer output with discrete transistors to drive the thyristor. The microcomputer samples the line voltage and determines the peak point. This can be accomplished by interpolation between zero crossings, peak detection or otherwise. The ROM required for storage of this program can reach 100 words and the buffering circuitry often contains many components; this approach can be expensive due to component and assembly costs. In addition, the microcomputer peak-fire program can be a significant portion of the small program space that is available in low-cost microcomputers.

Other circuits which have attempted to deal with inductive loads in switching elements and current surges produced therein are described in the Mar. 15, 1979 *Electronics Design* 6 article, pages 90–93 entitled "Inductively Loaded SSR's Control Turn-On to Eliminate First-Cycle Current Surges". Another article that deals with the same subject matter is in the *IEEE Transactions on Industrial Electronics and Control Instrumentation*, Volume IECI-27, No. 2, May 1980 entitled "A Digital Self-Compensating Method for Integral-Cycle Power Control of RL Loads". The latter article describes a feedback controlled digital circuit which provides for integral-cycle control of power in RL loads. The circuit adjusts the firing angle of a triac to eliminate the undesirable DC current in the current of RL loads. The initial conduction is started with a firing angle $\alpha = 90°$ and subsequently the feedback takes over to make the firing angle $\alpha$ equal to the power factor angle $\phi$. The feedback circuit senses the magnitude of the DC offset and uses this information as a negative feedback signal to shift the firing angle $\alpha$ from an initial value of $90°$ to $\phi$. As shown in FIG. 3 of that article, waveform G, which is the waveform present at the gate of the triac, provides a constant trigger to the triac for a period of five cycles. This method of providing the trigger continuously to the triac consumes a large amount of power. This approach is not applicable to low cost single chip integration.

Accordingly, it is an object of the present invention to provide a method and apparatus for reducing surge currents in reactive loads, and more particularly in inductive reactive loads.

Another object of the present invention is to provide an integrated controller for integral-cycle power control in systems with reactive loads.

Another object of the present invention is to provide a thyristor driver controller which minimizes surge currents in an inductive load by triggering a thyristor when the voltage across the thyristor reaches a predetermined magnitude.

Another object of the present invention is to provide a method and circuit for automatically insuring surge currents are minimized through a reactive load by monitoring zero crossings of the lead current and triggering the switching element on whenever the zero crossings occur regardless of the phase of the AC line voltage.

A further object of the present invention is to provide a thyristor driver for reactive loads which has applicability in the appliance and industrial control areas.

A still further object of the present invention is to provide a controller which minimizes power consumption while lending itself to integration on a semiconductor chip.

Other objects and features of the invention will become more rapidly understood from the following detailed description and appended claims when read in conjunction with the accompanying drawings in which like reference numerals designate like parts throughout the figures thereof, and in which:

FIG. 3 illustrates timing diagrams at different points in the circuit of FIGS. 2, 4 and 5;

It is known that the current through an inductive load lags the voltage across it normally by 90° and that the surge currents generated through such an inductive load are minimized in an integral-cycle controller by triggering a switching element, such as a thyristor or triac, "on" when the AC voltage reaches its peak (i.e., when $\theta = 90°$ and 270°) which, in a purely inductive load, corresponds to the "zero crossings" of the AC current through the load (and series switching element). However, in practical situations, no loads are purely inductive (as there is resistance in the windings, for example) and as the load varies, the zero-crossings of the load current will vary with time. This is the case in a transformer with a time-varying load attached to the output.

Accordingly, the present circuit automatically senses the zero crossings of the AC load current by sensing the current through a series thyristor and as the current through the load and series thyristor approaches zero (so as to turn the thyristor off), the voltage across such thyristor will reach a predetermined value which gates a trigger pulse to the thyristor to turn it back on immediately. Therefore the circuit according to the present invention provides an automatic method for insuring surge currents are minimized by monitoring zero crossings of the load current and triggering the thyristor back on regardless of where the zero crossings of the load current occur with respect to the phase of the AC line voltage.

Figure 1:
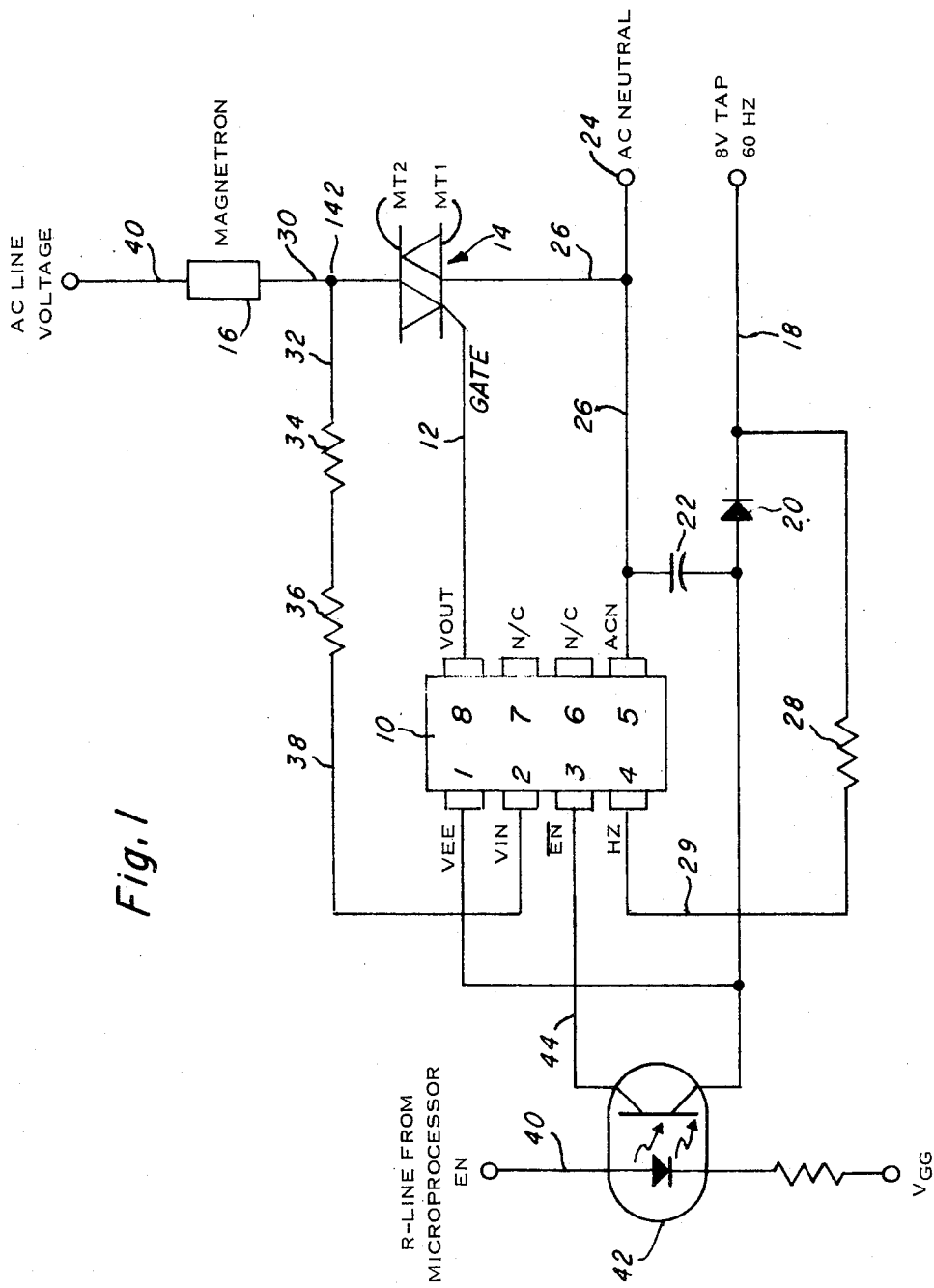
FIG. 1 illustrates a system application of the circuit according to the present invention.

Referring now to FIG. 1, there is illustrated a switching element drive circuit 10 in an integrated circuit package. This circuit 10 which is utilized to minimize surge currents in a reactive load is shown for purposes of illustration and explanation in an application for use in a microwave oven controller. Circuit 10 is used to trigger the gate electrode 12 of a switching element 14 which, by way of example, may be a thyristor or triac or other suitable switching element. For purposes of this invention, the switching element 14 will be referred to as a triac. Triac 14 controls the operation of a magnetron 16 in a microwave oven. The magnetron 16 will be triggered on and off dependent on the program inserted into the microwave oven control circuit by a user. A digital processor, such as a microprocessor (not shown) will allow a user to program information into the microwave oven controller, relating to the amount of time the magnetron tube is to be energized as well as to allow the user to select the power level or duty factor at which the magnetron is energized. As mentioned earlier, however, the circuit 10 according to the present invention minimizes surge currents which may be produced in the AC load current through magnetron 16 and triac 14.

Switching element drive circuit 10 has 8 pins, 6 of which are actually used. Pin 1 is connected to a signal VEE which provides a negative power supply of approximately −8 volts to pin 1. An 8 volt, 60 hertz signal (stepped down from the AC line voltage) is applied to conductor 18 which passes through rectifying diode 20 and filter capacitor 22. The AC neutral terminal (ACN) 24 is connected by conductor 26 to pin 5 of circuit 10. The other side of capacitor 22 is also connected to the ACN conductor 26; the AC neutral signal acts as the positive power supply for the circuit 10. The ACN conductor 26 is also connected to the main terminal 1 (MT 1) of triac 14. The 8 volt, 60 hertz signal on conductor 18 is applied through resistor 28 to pin 4 of circuit 10. For purposes of this explanation, the 60 hertz signal applied on pin 4 will be referred to as the reference signal. The main terminal 2 (MT 2) of triac 14 is coupled by way of conductor 30 to magnetron 16 and by conductor 32 to two limit resistors 34 and 36. The opposite side of resistor 36 is connected by way of conductor 38 to pin 2 of circuit 10 and produces the VIN waveform on such pin. The other side of magnetron 16 is connected by conductor 40 to the AC line voltage.

A microprocessor, such as the TMS 1000 manufactured and sold by Texas Instruments Incorporated, Dallas, Tex., (not shown), has its R-line 40 connected to an opto-isolator 42. The R-line 40 produces an enable signal (EN) which is designed to enable the magnetron during a predetermined time period in accordance with the user's instructions. The signal EN is inverted when it passes through opto-isolator 42 and appears as $\overline{EN}$ on conductor 44 connected to pin 3 of circuit 10. A signal VOUT is produced from pin 8 and is connected to the gate electrode 12 of triac 14.

The triac driver circuit 10 provides an interface between the microwave oven control circuitry (such as the microprocessor, not shown) and the triac 14 driving the magnetron 16. Circuit 10 is powered by a single negative supply, VEE, referenced to AC Neutral (ACN). Isolation from the control is in the enable R-line 40 in the form of opto-isolator 42.

When circuit 10 is enabled (by $\overline{EN}$ on pin 3), a peak fire circuit is activated which triggers triac 14 initially at the next peak of the AC line voltage on conductor 40. After triac 14 is initially turned on, it will turn off at zero current crossings unless it is retriggered by a trigger pulse (VOUT) on gate 12. AC current through triac 14 is sensed by measuring the voltage across terminals MT 1 and MT 2 of triac 14. When this voltage approaches or crosses zero volts, the triac will turn off and the voltage across the triac 14 will start to rise rapidly towards the AC line voltage. As this voltage reaches a predetermined voltage level (approximately 8.0 volts), a trigger pulse from the peak fire circuit will be gated to and present at pin 8, if the enable signal $\overline{EN}$ is still present. This trigger pulse will turn on the triac 14 and magnetron 16.

Figure 2:
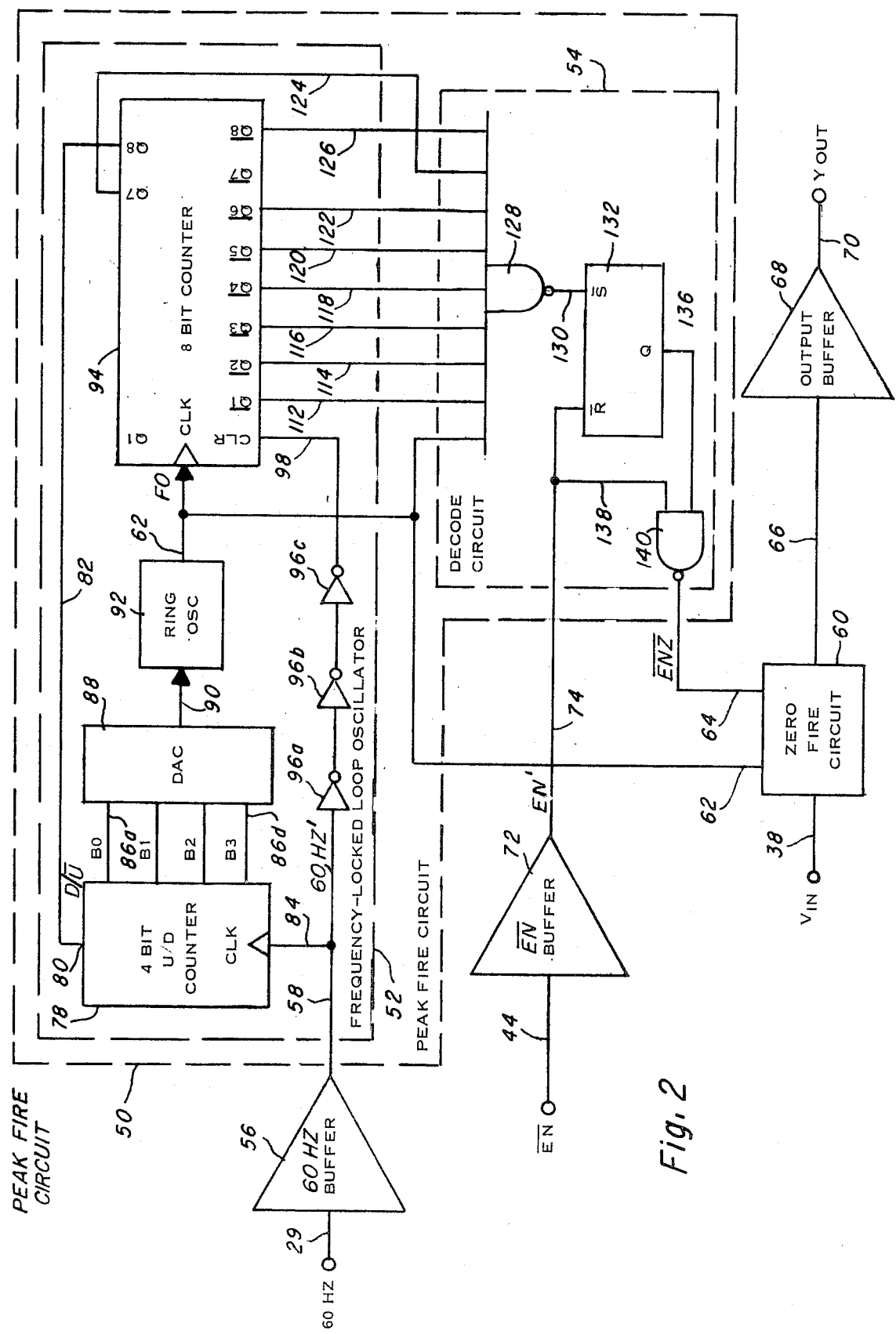
FIG. 2 illustrates a block diagram of the circuit according to the present invention.

Referring now to FIG. 2, there is illustrated a block diagram of the switching element drive circuit 10 illustrated in FIG. 1. The drive circuit 10 is comprised of a peak fire circuit 50 which is comprised of a frequency-locked loop oscillator 52 and a decode circuit 54. The 60 hertz signal on pin 4 (FIG. 1) is applied to conductor 29 as an input to a 60 hertz buffer circuit 56. The output from the 60 hertz buffer circuit 56 is applied by way of conductor 58 to the input of frequency-locked loop oscillator 52. The zero current crossing signal VIN is applied by way of conductor 38 to zero fire circuit 60. The output of the frequency-locked loop oscillator 52, signal $F_0$, is applied by way of conductor 62 as an input to zero fire circuit 60; the other input to zero fire circuit 60 is the zero fire detection enable signal ($\overline{ENZ}$) which is applied by way of conductor 64 to zero fire circuit 60. The output of zero fire circuit 60 is coupled by way of conductor 66 to output buffer 68 which is a current amplifier producing a signal VOUT on conductor 70 capable of driving or triggering gate 12 of triac 14 and turning the triac on. The enable signal from the microwave controller microprocessor ($\overline{EN}$) is applied by way of conductor 44 as an input to the $\overline{EN}$ buffer circuit 72. The output signal EN' is applied by way of conductor 74 as an input to decode circuit 54.

The frequency-locked loop oscillator 52 may be any conventional frequency-locked loop oscillator such as that described in U.S. patent application Ser. No. 175,170, filed Aug. 4, 1980 and entitled "Frequency/-Phase Locked Loop Circuit" and assigned to the same assignee as the present invention. The frequency-locked oscillator produces a series of pulses, FO, which are synchronized to the AC line voltage frequency. FIG. 3 illustrates timing diagrams at different points in the circuit of FIG. 2, among which is waveform 76 which represents FO. The oscillator circuit 52 is comprised of a comparator circuit 78 which in essence is a 4-bit up/down counter having a down or up control terminal 80. The up/down counter 78 compares the signal on line 82 with the signal on line 84 and adjusts the count of up/down counter 78 to bring the signals on lines 82 and 84 into synchronization. A digital output from up/down counter 78 is transmitted via lines 86a–86d to digital-analog converter 88. The output of digital-to-analog converter 88 is transmitted via line 90 to ring oscillator 92. The output of oscillator 92 is transmitted via line 62 to the clock input of an 8 bit counter 94. The most significant bit ($Q_8$) from counter 94 is transmitted via line 82 to the D/$\overline{U}$ terminal 80 of up/down counter 78. The reference frequency (60 Hz') is transmitted via line 58 through three inverting gates 96a–96c and then via line 98 to the clear terminal of counter 94. This can be seen more clearly from FIG. 4 wherein line 98 is attached to the clear terminals of each of the eight stages of 8 bit counter 94; also it can be seen more clearly from FIG. 4 that line 100 is connected to the clock terminal of stage one of counter 94 and thereafter the Q1 output of the first stage is connected to the clock input terminal of the second stage with this connection pattern carried throughout the eight stages of counter 94.

Figure 4A:
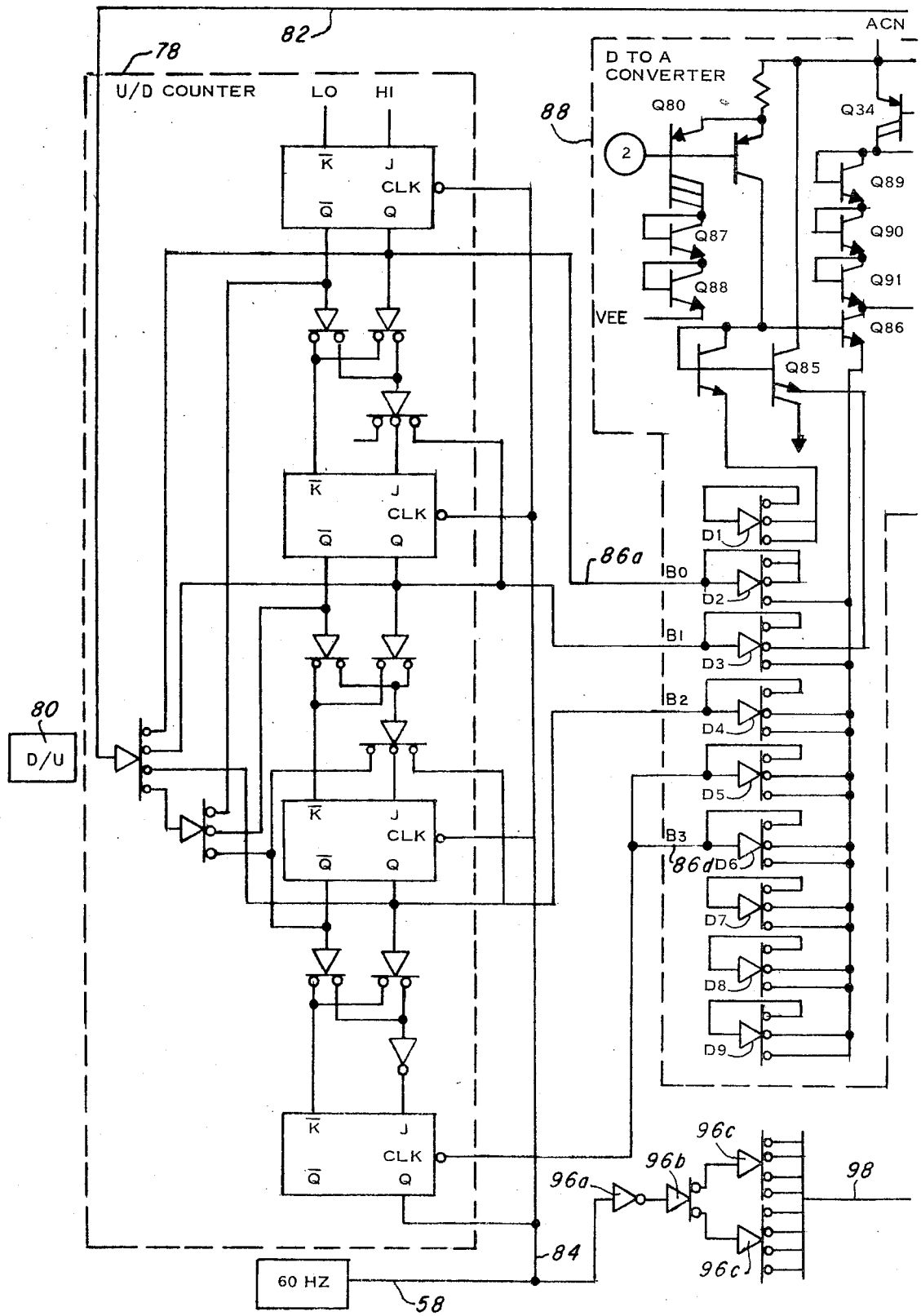
FIGS. 4a and 4b illustrate the schematic diagram of an I$^2$L implementation of the peak fire circuit including both the frequency-locked loop oscillator circuit as well as the decode circuit.
Figure 4B:
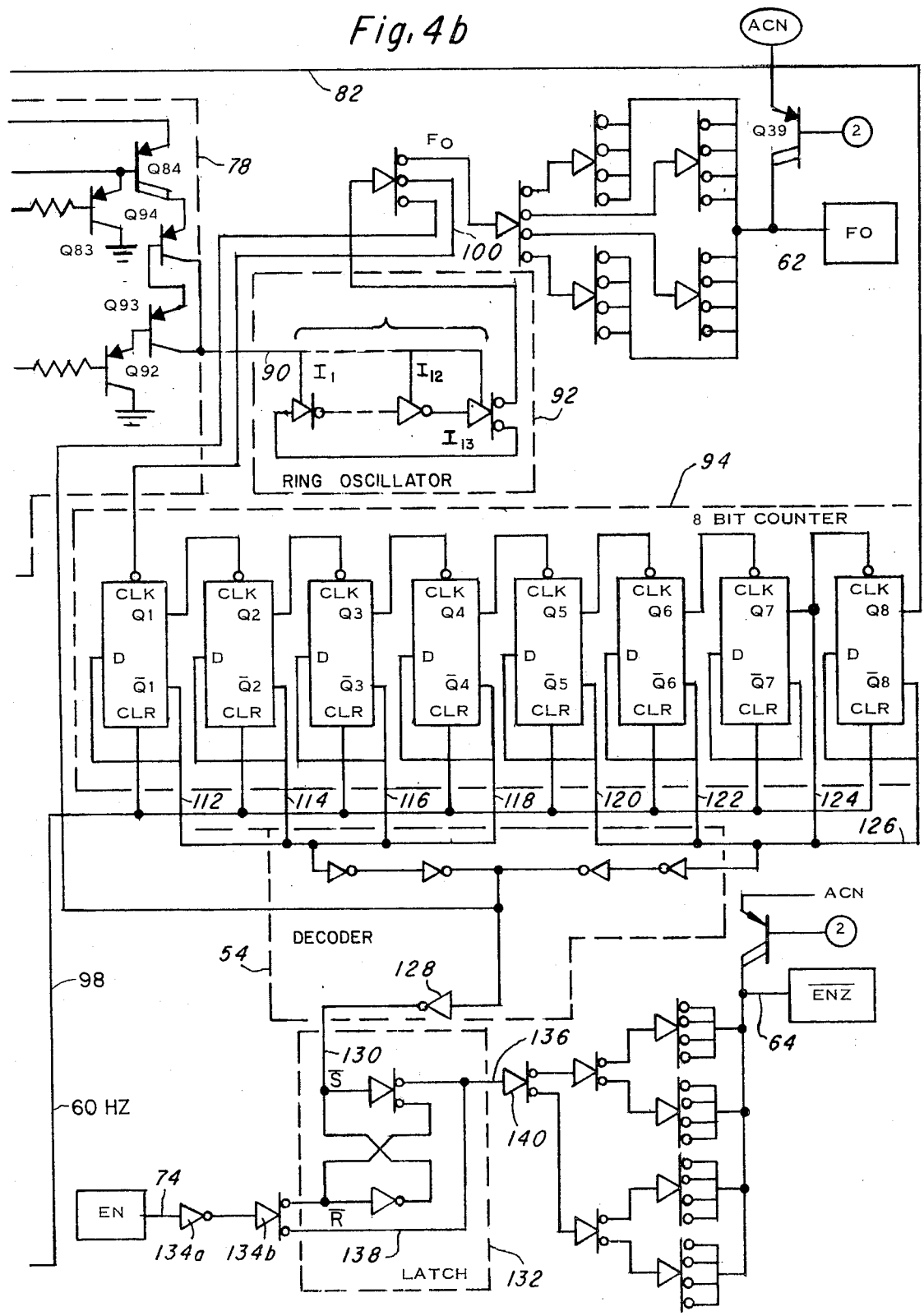

Ring oscillator 92, as shown in FIG. 4, is connected up as an odd number of inverter stages (namely 13). Up/down counter 78 illustrated in FIG. 4 is a standard design using J-K flip-flops and appropriate gating to implement the up/down control. The digital-to-analog converter 88 is particularly adapted for implementation on an I²L chip; however, any standard digital-to-analog converter can be used, such as a binary-weighted resistor or R-2R ladder types.

In operation, the four bit up/down counter 78 combines the up count and down count function in a single line 82, now labeled D/$\overline{U}$. The clock is supplied by a common clock input labeled 84 for both up and down count. A high level or logic one on line 82 will cause up/down counter 78 to count down one count when a clock is present at 84. A low level or logic zero on line 82 will cause counter 78 to count up one count when a clock is present at 84. The up/down counter 78 determines whether the output Q8 of counter 94 on line 82 (which is a divided down representation of FO) occurs before or after the reference signal applied to the clock terminal of counter 78 on line 84. This is accomplished as follows.

If output Q8 from counter 94 occurs before the falling edge of the reference frequency on line 84, then line 82 will be high or a logic one will be transmitted to the D/$\overline{U}$ terminal of counter 78, indicating that the counter should count down one count. If the reference on line 84 occurs first, i.e., before Q8 from counter 94 has had a chance to go high or become a logic one, then line 82 will transmit a low level or logic zero to the D/$\overline{U}$ terminal indicating the up/down counter 78 should count up one count. The up/down counter 78 will continue either to count down or up dependent upon the relationship of the reference frequency on line 84 and FO such that the counter 78 and digital-to-analog converter 88 will adjust the oscillator frequency of ring oscillator 92 in such a direction as to minimize the difference error between the two signals. The three inverting gates 96a–96c shown in series with the reference signal on line 58 and connected to the clear terminal of 8 bit counter 94 are necessary to delay the clearing of counter 94 until after the up/down counter 78 has had a chance to clock.

The 60 hertz buffer circuit 56 (illustrated in FIG. 2 and FIG. 5) has as its input a 60 hertz signal of approximately 8 volts peak voltage. This signal is assumed to be referenced to the AC neutral (ACN). Such a signal could be supplied by a transformer tap with one end of the winding tied to the primary neutral connection. The output of the 60 hertz buffer circuit 56 in FIG. 2 appears on line 58 and is designated as 60 Hz' or HZ' and is a square wave referenced to the negative supply. Referring specifically to the 60 Hz buffer circuit 56 in FIG. 5, transistors Q6 and Q7 form a differential input pair for the buffer circuit 56. Q8 and Q9 form a current mirror load and transistor Q1A is the current source for the basic comparator formed by Q6–Q9. Transistors Q2 and Q3 drop the input level of the input by 2VBE (i.e., the voltage drop across the base-emitter junctions of Q2 and Q3); similarly, Q4 and Q5 drop the potential of the reference input in order to keep transistor Q1A from saturating. Transistors Q10 and Q11 with their associated resistors 102 and 104 form current sinks for the inputs to the comparator (Q6–Q9). The comparator output is taken from the collector of transistor Q6 to the base of transistor Q13. Transistor Q13 acts as an emitter follower for the output signal and drives transistor Q14. Transistor Q13 also drives Q12, which acts to provide hysteresis at the input. When transistor Q13 is turned on by the comparator, transistor Q12 is turned on and saturates, effectively shorting out transistor Q5 and pulling the base of Q7 more positive. In this state, the output of the buffer is a logic zero or a low level. As the input voltage level grows more positive, transistor Q6 starts to turn off, decreasing the drive to transistors Q13 and Q12. When the drive to transistor Q12 decreases to such a point that it comes out of saturation, node 106 switches back to 2VBE (two base-to-emitter voltage drops) below the positive supply (ACN). This shuts off transistors Q6 and Q13 and the output changes state. In this state the output is a high level or logic one. It can be seen that the positive-going threshold is approximately one VBE above the positive supply and that the negative-going threshold is exactly equal to the positive supply voltage. As mentioned previously, the output of the 60 Hz buffer circuit 56 is a square wave which is applied to the clock terminal of up/down counter 78 and the inverting gate 96a (FIG. 2).

The peak fire circuit 50 assures that triac 14 (and magnetron 16) is turned on (and load current begins to flow) when the AC line voltage illustrated in FIG. 3 as waveform 108 reaches its peak at 110 (at this point, $\theta = 90°$). Since the frequency-locked oscillator 52 is synchronized to the AC line voltage (waveform 108 in FIG. 3), it will oscillate at a known frequency F0 and clocks counter 94 which is reset every cycle of the AC line voltage. Since the oscillator frequency F0 is known, the voltage peak at point 110 on waveform 108 will occur at a known state of the counter. This count is decoded in decode circuit 54 illustrated in FIGS. 2 and 4. Eight decode lines 112-126 input to logic gate 128; these decode lines are connected respectively to $\overline{Q1}$-$\overline{Q6}$, $\overline{Q7}$ and $\overline{Q8}$. When all of the outputs are logic ones on decode lines 112-126, an output signal will be generated on line 130 from logic gate 128. The output of gate 128 is connected to the $\overline{S}$ side of latch circuit 132. The $\overline{R}$ side of latch circuit 132 is connected to the EN' signal through conditional logic gates 134a and 134b (FIG. 4). The output of latch circuit 132 on conductor 136 as well as conductor 138 are inputs to logic gate 140. The output of gate 140 produces a signal on conductor 64 called $\overline{ENZ}$, a zero fire enabling signal.

Figure 5A:
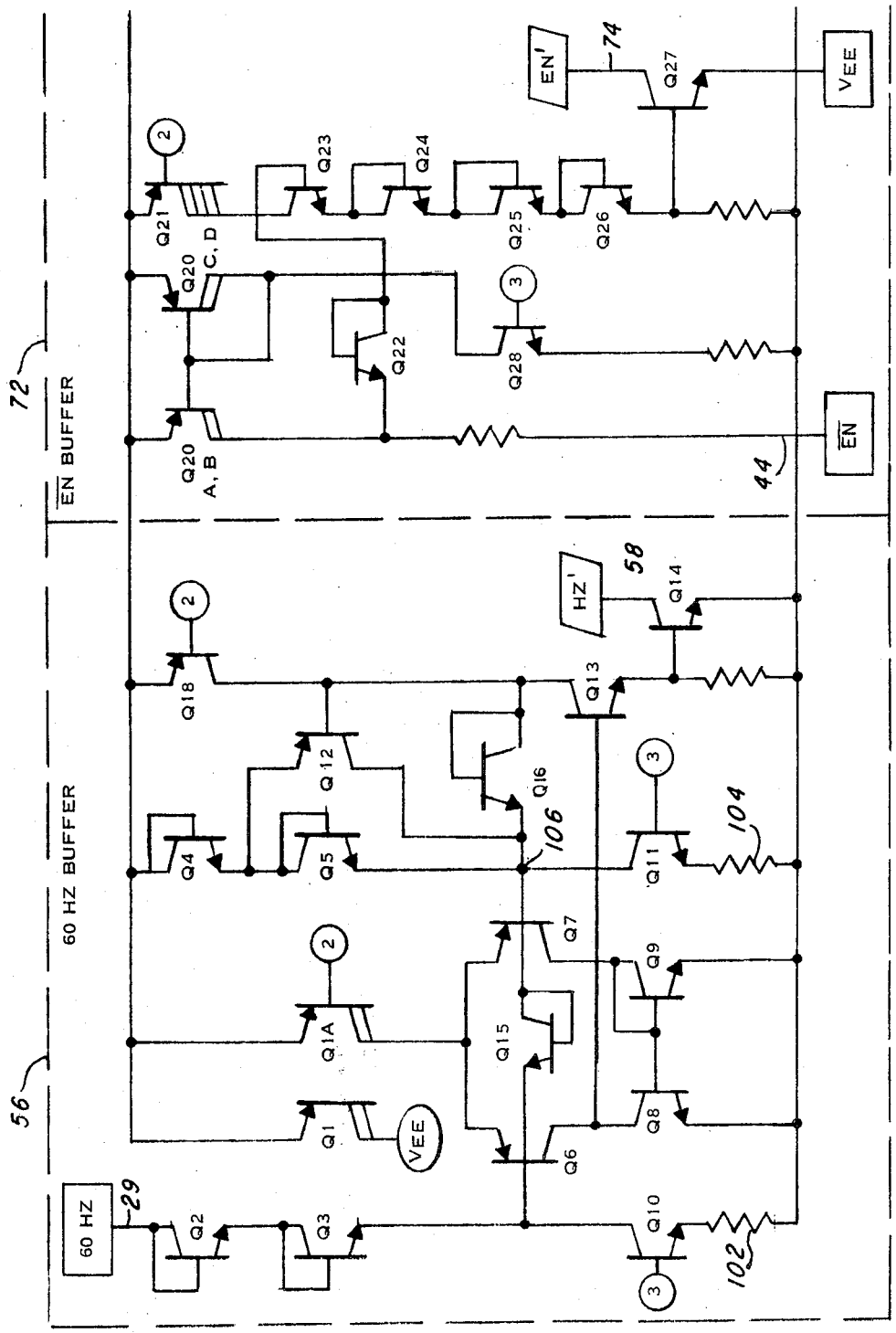
FIGS. 5a and 5b illustrate the schematic diagram of an I$^2$L implementation of other portions of the circuit according to the present invention.
Figure 5B:
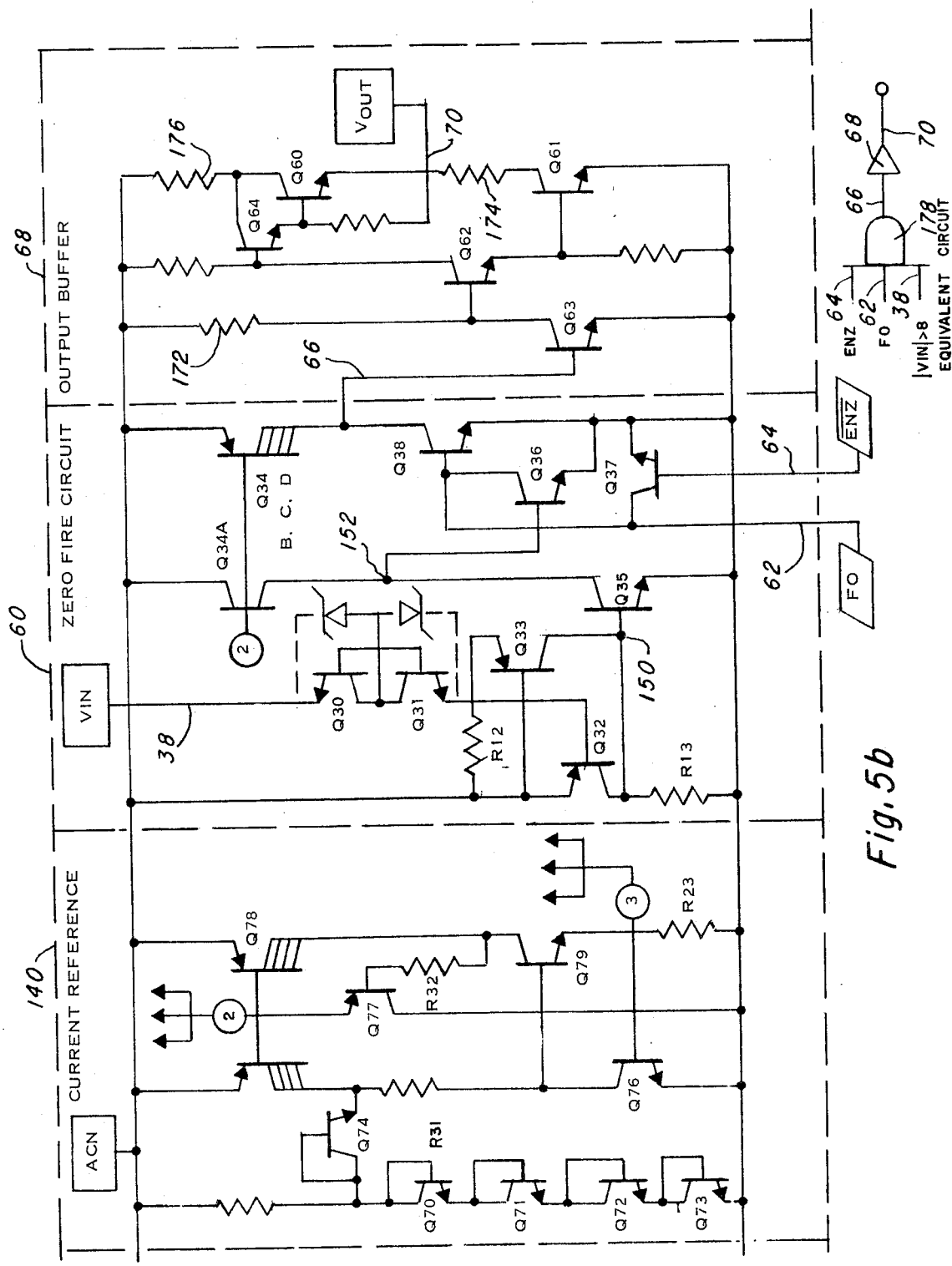

The $\overline{EN}$ buffer "enables" the logic to fire the triac. It is an asynchronous input. With an input level near the positive supply (ACN), the $\overline{EN}$ buffer circuit is disabled and no trigger pulses will be generated. When the input approaches the negative supply (VEE), this causes the internal signal EN' to go to a high state and trigger pulses will be initiated at the next positive peak of the AC line voltage. The $\overline{EN}$ pin 3 (FIG. 1) must be held low for all cycles in which a trigger pulse to the triac is desired. This can be seen from waveform 141 which illustrates $\overline{EN}$. The circuit operation of the $\overline{EN}$ buffer 72 illustrated in FIG. 5 is as follows. The current source transistor Q21 biases on transistors Q23-Q27, thus pulling EN' near the negative supply voltage VEE. Current sink transistor Q28 and current mirror transistor Q20 hold $\overline{EN}$ in a high state until its current is overcome by the input source, such as an opto-isolator. When the input is pulled low enough, transistor Q22 turns on and diverts the current from transistors Q23-Q27, turning transistor Q27 off and allowing EN' to be pulled high.

The current reference circuit 140 illustrated in FIG. 5 involving transistors Q70-Q79 is a basic text book current source described on pages 244-245 of the book entitled *Analysis and Design of Analog Integrated Circuits* by Paul R. Gray and Robert G. Meyer published by John Wiley and Sons, Copyrighted 1977.

The zero fire circuit 60 is illustrated in FIG. 2 and FIG. 5. After the triac is initially fired at the time of occurence of the peak of the AC voltage under peak fire control, the retriggering of the triac is controlled by detection of zero current through the triac. This is accomplished by zero fire circuit 60. Zero fire circuit 60 detects the AC load current through triac 14 and is connected between magnetron load 16 and MT 2 of triac 14 at node 142 with limit resistors 34 and 36 connected therebetween (FIG. 1). When a zero current crossing is detected, trigger pulses provided by frequency-locked loop oscillator 52 on line 62 (waveform 76 in FIG. 3) are gated to the output buffer 68 via line 66. The output of the output buffer 68 on line 70 provides the trigger pulses to drive gate 12 of triac 14; the waveform illustrating VOUT is shown at 144. Trigger pulses will continue until the triac AC current goes to a non-zero value or the enable input on line 64 (waveform $\overline{ENZ}$ 146 in FIG. 3) is inactivated (for example at point 148 on waveform 146).

The detailed schematic of the zero fire circuit 60 is illustrated in FIG. 5. As can be seen, there are three inputs to zero fire circuit 60, VIN (the triac current sensing signal) on line 38, FO (the synchronized oscillator signal from frequency-locked loop oscillator 52) on line 62, and $\overline{ENZ}$ (the enable signal from peak fire circuit 50) on line 64. Transistors Q30 and Q31 act as two back-to-back zener diodes (each having breakdown voltages of approximately 6.5 volts). No current will flow into or out of line 38 until the breakdown zener potential is exceeded. This breakdown voltage may be varied depending upon the characteristics of transistors Q30 and Q31 (and the number of VBE drops in series with said transistors) to be of any predetermined magnitude. If the signal VIN is of a predetermined magnitude which exceeds the breakdown voltage of transistor Q30 and VBE drops (approximately 8.0 volts), current will flow into the emitter of transistor Q33 causing node 150 to move toward a more positive potential, thereby turning on transistor Q35. Transistor Q35 will saturate since its collector current is constrained to be small (approximately 25 microamps). The collector of transistor Q35 (node 152) will then drop below the value required to turn on transistor Q36. Transistor Q36 is therefore turned off and the signal labeled FO on line 62 will be present at the base of transistor Q38. As the VIN signal reaches the breakdown voltage of transistor Q30 (approximately 8.0 volts as shown at point 158 on waveform 156) $\overline{ENZ}$ is in the low (enable) position and a signal, VOUT, will be gated through output buffer 68 as shown at point 160 on waveform 144. When the signal VIN goes negative and exceeds the zener breakdown potential of transistor Q31 (for example, point 154 on waveform 156 in FIG. 3), the input current is drawn from the base of transistor Q32. Again, node 150 is drawn toward a more positive potential and turns on transistor Q35 and the circuit operation will continue as described immediately above.

In the case where VIN does not exceed the breakdown voltage of transistor Q30 and Q31 (for example, points 162 and 164 on waveform 156) triac 14 is in its "on" or conducting state; therefore the voltage drop between node 142 (FIG. 1) and terminal 24 is approximately $\pm 2$ volts. This accounts for points 162 and 164 on waveform 156 (VIN) dropping back down from points 158 and 154, respectively, (which are momentarily at the predetermined magnitude required to break down the zener potential of transistors Q30 and Q31). As mentioned earlier when VIN does not exceed the breakdown voltage of Q30 and Q31 (triac 14 is on), transistors Q32 and Q33 remain in the "off" state. Node 150 is thereby pulled to the negative supply potential VEE, shutting off transistor Q35 and directing the collector current of transistor Q34A to the base of transistor Q36, holding the base of transistor Q38 off and inhibiting the propagation of signal FO (waveform 144 in FIG. 3) from passing via line 66 to the output buffer 68. This accounts for the fact that the pulses from waveform 76 (FO) in FIG. 3 are not allowed to be gated through to output buffer 68 during the time periods indicated by points 166 and 168 on waveform 144 (VOUT) in FIG. 3.

FIG. 5 illustrates the schematic of output buffer 68 which is a current amplifier which will directly drive the gate 12 of triac 14. Output buffer 68 is a push-pull circuit which drives the gate terminal 12 of triac 14, either directly (as illustrated), or through a capacitor or pulse transformer, if required. In the disabled state, transistor Q60 holds the output on line 70 at the AC neutral potential. When output buffer circuit 68 is activated, transistor Q60 turns off and transistor Q61 pulls the gate of triac 14 towards the negative power supply VEE (point 170 on VOUT waveform 144, for example) turning, therefore, triac 14 on.

The base of transistor Q38 is held low in the inactive state. Transistor Q63 is held on and saturated by transistor Q34BCD. This holds transistors Q61 and Q62 off, and transistors Q60 and Q64 pull up the output to near the AC Neutral power supply. At this point, transistor Q60 turns off and the output pulls up at a slower rate near the AC Neutral power supply level. During the time signal F0 on line 62 pulses high, transistor Q38 turns on and consequently turns off transistor Q63. Resistor 172 supplies base current for transistor Q62. The emitter current of transistor Q62 turns pull down transistor Q61 on and the collector current of transistor Q62 shuts off transistors Q64 and transistor Q60. Resistors 174 and 176 limit short circuit currents.

In FIG. 5 there is illustrated immediately below zero fire circuit 60 and output buffer 68 the equivalent circuits thereof. Zero fire circuit 60 can be symbolized as an AND gate 178 having three inputs ENZ, F0, and |VIN|>8 volts (a voltage of a predetermined magnitude, namely, the breakdown voltage of zener transistors Q30 and Q31 and any junction voltage drops). The output of AND gate 178 is transmitted via line 66 through buffer 68 and the VOUT signal is generated on line 70.

The overall system operation of the switching element drive circuit 10 can be summarized by reference to the timing diagrams in FIG. 3. Waveform 108 in FIG. 3 represents the AC line voltage which is present on line 40 (FIG. 1) and connected to magnetron 16. Magnetron 16 represents an inductive reactive load which causes large surge currents to occur in the load current line when triac 14 is turned on initially unless compensation is provided for. Circuit 10 provides this automatic compensation feature. At point 180 on the AC line voltage waveform 108, triac 14 is in the non-conducting state and the load current through magnetron 16 and triac 14 is zero (as shown at point 182 of load current waveform 184). This is because the microprocessor control (not shown) has not enabled the R-line 40 (FIG. 1) with an enable signal and therefore $\overline{\text{EN}}$ on line 44 is still high (at point 186 on waveform $\overline{\text{EN}}$). As mentioned with respect to the description of peak fire circuit 50 in FIGS. 2 and 5, $\overline{\text{EN}}$ on line 44 must be low before the zero fire circuit will gate through one of the trigger pulses (for example, trigger pulse 188 on VOUT waveform 144) and turn on triac 14.

Since triac 14 is nonconducting and no load current is flowing therethrough, node 142 will be at the same potential and track the AC line voltage waveform 108. This can be seen at point 188 of MT2 voltage waveform 190.

Also the voltage waveform VIN at 156 will attempt to track the AC line voltage waveform 108; however at point 192 on VIN waveform 156, the voltage has exceeded 8 volts and the zener breakdown voltage of transistor Q31 (in FIG. 5) in the zero fire circuit 60 clamps the VIN voltage waveform to 8 volts. As the AC line voltage 108 and the voltage VIN waveform 156 decrease to less than 8 volts, the zener breakdown voltage of transistors Q30 and Q31 will not be exceeded and the VIN waveform 156 will track (as shown at 194) the AC line voltage waveform 108. As the AC line voltage waveform 108 goes positive and exceeds the zener breakdown voltage of transistor Q30, the VIN voltage waveform 156 will be clamped at the +8 volt level shown at point 196 on waveform 156.

At point 198 on the enable ($\overline{\text{EN}}$) waveform 146, that waveform goes from a high logic level to a low logic level. In other words, the microprocessor has told the microwave control circuit to turn the magnetron "on". To avoid the surge current problem discussed previously, the peak fire circuit 50 will insure that the initial conduction of triac 14 occurs when the AC line voltage is at 90° as shown at point 110 on line voltage waveform 108. The $\overline{\text{EN}}$ signal on line 44 when it goes from a high level at point 186 on wavefore 141 to a low level (point 198 on waveform 141) will remove the reset signal from latch circuit 132 (illustrated in FIGS. 2 and 4). Since the frequency-lock loop oscillator is oscillating at a known frequency, the voltage peak 110 will occur at a known state (01000000) of the 8 bit counter 94 and this count is decoded on decode lines 112–126. When this count occurs, latch circuit 132 will be set and this signal will be transmitted through logic gate 140 and form waveform $\overline{\text{ENZ}}$ (waveform 146 in FIG. 3) on line 64. Accordingly, waveform 146, which is a modified enable waveform, will go from a high level to a low (enable) level at point 200 on waveform 146 which corresponds to the 90° angle of waveform 108 shown at point 110. Referring to the equivalent circuit of the zero fire circuit 60, it will be noted that all three signals on the input of gate 178 necessary to enable gate 178 are present. Namely, $\overline{\text{ENZ}}$ on line 64 is in the low (enable) state, F0 (the frequency-locked loop oscillator output is always present and enabled), and the voltage VIN is greater than the predetermined magnitude required to break down zener transistor Q30 (which is shown at point 202 on VIN waveform 156). Since all three inputs are enabled or activated, a trigger pulse 188 on waveform 144 (VOUT) is provided to gate 12 of triac 14 to turn triac 14 on. As soon as triac 14 begins conducting, the voltage level at node 142 across MT-2 drops to approximately 2 volts as shown at point 204 on waveform 190. The voltage VIN (waveform 156) will follow the voltage at node 142 and drop to a corresponding voltage as shown at point 206.

Another feature of the present invention is that if the first trigger pulse 188 of waveform 144 does not trigger triac 14 on, the voltage and current conditions would remain fixed such that subsequent trigger pulses 188a, 188b, etc. would be provided to gate 12 until triac 14 was triggered.

After the triac is initially fired at the 90° point (point 110 on waveform 108), the circuit provides additional trigger pulses to triac 14 at zero crossings of load current waveform 184 (regardless of whether or not this occurs when the AC line voltage waveform 108 reaches its peak). As a practical matter, in a microwave oven application, the zero crossings of the load current waveform tend to advance and become more in line with the AC line voltage waveform. Another advantage of this invention is that this circuit automatically tracks the zero crossings and fires the triac at the correct time.

As the AC load current decreases to a prescribed current, the triac will turn off; this prescribed current is designated as the holding current of the triac and is typically 50 to 100 milliamps at 25° C. This point is designated as point 208A. At this point, the triac 14 will stop conducting and its current will go to zero. As current stops, node 142 will start to approach the AC line voltage which is at a very high negative value as shown at point 210 at waveform 108. In other words, the voltage at node 142 shown as waveform 190 in FIG. 3 will go from point 204A negative to point 210. As the voltage at node 142 attempts to go to a very high negative value, the zener break down voltage of transistor Q31 and zero fire circuit 60 (in FIG. 5) is exceeded. As soon as this condition occurs, all three conditions are again activated on gate 178 in the equivalent circuit shown in FIG. 5 to produce and allow another gating pulse 214 to be gated through which immediately turns triac 14 back on. AC load current immediately begins to flow again as shown at point 216 and the voltage across the triac 14 is approximately 2 volts as shown at point 218 on waveform 190.

This cycle will continue to occur as illustrated in FIG. 3 until the microwave oven controller microprocessor disables the enable signal as shown at point 220 on waveform 141. When $\overline{EN}$ is disabled, this resets latch circuit 132 (illustrated in FIGS. 2 and 4), and also disables the modified enable signal $\overline{ENZ}$ shown at point 148 of waveform 146. Referring to the equivalent circuit illustrated in FIG. 5, it can be seen that one of the inputs to AND gate 178 (the equivalent of zero fire circuit 60) has been deactivated and accordingly no further trigger pulses will be allowed to trigger the gate of triac 14. This can be seen by referring to waveform 144 (VOUT) and noting that no trigger pulses occur after point 220. Since triac 14 is in the conducting state, it will continue to conduct until the current therethrough becomes equal to or less than the holding current which occurs at point 224 of the AC load current waveform 184. At that point in time, the voltage across triac 14 and node 142 will immediately be at the same potential as the AC line voltage; this is shown at point 226a of waveform 190 and point 226b on AC line voltage waveform 108. From that point on, the voltage at node 142 will track exactly the AC line voltage as long as triac 14 is non-conductive.

When triac 14 is in the non-conducting state, the voltage VIN will vary between −8 volts (point 228a on waveform 156) and +8 volts as shown at 228b. This voltage will be clamped at the zener breakdown voltages of transistors Q30 and Q31 in zero fire circuit 60 (FIG. 5).

Thus a circuit has been disclosed for driving a switching element (thyristor, triac, etc.) having a reactive load (such as a magnetron, motor, etc.) to minimize surge currents during the turn on time period of the switching element. This circuit will initially fire a triac when the circuit is enabled and the AC line voltage reaches its first peak. The retriggering of the triac is controlled by detection of zero current through the triac regardless of where the zero current crossing may occur. When a zero current crossing is detected, a trigger pulse is gated to the output buffer and to the gate of the triac. Trigger pulses will continue until the triac current goes to a non-zero value or the zero current crossing circuit is disabled.

Although the present invention has been shown and illustrated in terms of a specific apparatus and method, it will be apparent that changes or modifications can be made without departing from the spirit and scope of the invention as defined by the appended claims.

What is claimed is:

1. A circuit for minimizing the surge currents in an AC load current produced by an AC voltage applied to a reactive load comprising:
   a thyristor coupled to said load which may be switched into a conductive and non-conductive state,
   peak fire circuit means coupled to said AC voltage which generates a series of trigger pulses synchronized with the AC voltage and generates a peak fire enable signal that corresponds to the first peak of the AC line voltage, and
   zero fire circuit means coupled to said thyristor and said peak fire circuit for sensing the change in voltage and current of said thyristor such that when a voltage of a predetermined magnitude across said thyristor appears and said peak fire enable signal is present, trigger pulses turn on the thyristor initially at the first peak of the AC line voltage and thereafter turns on the thyristor when the AC current therethrough approaches zero,
   said peak fire circuit means comprising
   a frequency-locked loop oscillator for producing a series of trigger pulses synchronized with the AC line voltage, and
   decoder means coupled to said frequency-locked loop oscillator for producing a zero fire enabling gating signal at the peak of said AC line voltage, and
   said frequency-locked loop oscillator comprising an up/down counter coupled to signals representative of the frequency of said AC line voltage and said trigger pulses for determining which of said signals occurs first and generating at least one digital signal indicating whether said trigger pulse frequency should be increased or decreased,
   digital-to-analog converter means coupled to said digital signals for generating increasing or decreasing analog control voltage steps related to the increasing or decreasing digital signal steps,
   a variable frequency control oscillator coupled to said converter for adjusting the trigger pulses upward or downward in order to obtain synchronization between said AC line voltage and said trigger pulses, and
   a counter coupled between said oscillator and said up/down counter for dividing down said trigger pulses.

2. A control circuit for a microwave oven which minimizes surge currents in the AC current produced by an AC voltage applied to a magnetron in the oven, comprising:
   a thyristor to be coupled to said magnetron which may be switched into a conductive and non-conductive mode,
   a digital processor for producing an enable signal when said thyristor is to be turned on,
   peak fire circuit means coupled to said enable signal which generates a series of trigger pulses synchronized with the AC line voltage and generates a zero fire enable signal that corresponds to the first peak of the AC line voltage following initiation of said enable signal, and
   zero fire circuit means coupled to said thyristor and said peak fire circuit for sensing the change in voltage and current of said thyristor such that when a voltage of a predetermined magnitude across said thyristor appears and said zero fire enable signal is present, trigger pulses turn on the thyristor initially at the first peak of the AC line voltage following initiation of said enable signal and thereafter when the AC current through said thyristor approaches zero, said digital processor comprising a microprocessor.

3. A control circuit for a microwave oven which minimizes surge currents in the AC current produced by an AC voltage applied to a magnetron in the oven, comprising:
   a thyristor coupled to said magnetron which may be switched into a conductive and non-conductive mode,
   a digital processor for producing an enable signal when said thyristor is to be turned on,
   peak fire circuit means coupled to said enable signal which generates a series of trigger pulses synchronized with the AC line voltage and generates a zero fire enable signal that corresponds to the first peak of the AC line voltage following initiation of said enable signal, and
   zero fire circuit means coupled to said thyristor and said peak fire circuit for sensing the change in voltage and current of said thyristor such that when a voltage of a predetermined magnitude across said thyristor appears and said zero fire enable signal is present, trigger pulses turn on the thyristor initially at the first peak of the AC line voltage following initiation of said enable signal and thereafter when the AC current through said thyristor approaches zero,
   said peak fire circuit means comprising a frequency-locked loop oscillator for producing a series of trigger pulses synchronized with the AC line voltage, and
   decoder means coupled to said frequency-locked loop oscillator for producing a zero fire enabling gating signal at the peak of said AC line voltage, said frequency-locked loop oscillator comprising an up/down counter coupled to signals representative of the frequency of said AC line voltage and said trigger pulses for determining which of said signals occurs first and generating at least one digital signal indicating whether said trigger pulse frequency should be increased or decreased,
   digital-to-analog converter means coupled to said digital signals for generating increasing or decreasing analog control voltage steps related to the increasing or decreasing digital signal steps,
   a variable frequency control oscillator coupled to said converter for adjusting the trigger pulses upward or downward in order to obtain synchronization between said AC line voltage and said trigger pulses, and
   a counter coupled between said oscillator and said up/down dounter for dividing down said trigger pulses.

4. A circuit according to claim 3 wherein said thyristor is a triac in series with said load.

5. A circuit for minimizing the surge currents in an AC load current produced by an AC voltage applied to a reactive load comprising:
   a thyristor coupled to said load which may be switched into a conductive and non-conductive state,
   a frequency-locked loop oscillator for producing a series of trigger pulses synchronized with the AC line voltage,
   decoder means coupled to said frequency-locked loop oscillator for producing a zero fire enabling gating signal at a predetermined time with respect to said AC line voltage, and
   zero detector circuit means coupled to said thyristor, oscillator and decoder means for sensing the change in current and voltage of said thyristor when said thyristor changes states such that, when a voltage of predetermined magnitude appears across said thyristor and said enabling signal is present, a trigger pulse is gated therethrough to said thyristor to switch it into its conductive state,
   said frequency-locked loop oscillator comprising an up/down counter coupled to signals representative of the frequency of said AC line voltage and said trigger pulses for determining which of said signals occurs first and generating at least one digital signal indicating whether said trigger pulse frequency should be increased or decreased,
   digital-to-analog converter means coupled to said digital signals for generating increasing or decreasing analog control voltage steps related to the increasing or decreasing digital signal steps,
   a variable frequency control oscillator coupled to said converter for adjusting the trigger pulses upward or downward in order to obtain synchronization between said AC line voltage and said trigger pulses, and
   a counter coupled between said oscillator and said up/down counter for dividing down said trigger pulses.

6. A circuit according to claim 5 wherein said digital signals increase or decrease is discrete digital steps and said increasing or decreasing analog control voltage change by an amount related to the least significant bit of said converter.

7. A circuit according to claim 5 wherein said decoder means decodes the state of said counter which corresponds to the peak of the AC line voltage and generates a peak fire detection signal.

8. A circuit according to claim 7 further including logic circuitry to combine said peak fire detection signal with an enable signal to produce said zero fire enable signal.

9. A circuit according to claim 8 wherein said thyristor is initially conductive when said AC line voltage is at its peak and is subsequently triggered into its conductive state when the current through said thyristor approaches zero.

10. A circuit for minimizing the surge currents in an AC load current produced by an AC voltage applied to a reactive load comprising:
   a thyristor coupled to said load which may be switched into a conductive and non-conductive state,
   a frequency-locked loop oscillator for producing a series of trigger pulses synchronized with the AC line voltage,
   decoder means coupled to said frequency-locked loop oscillator for producing a zero fire enabling gating signal at a predetermined time with respect to said AC line voltage, and
   zero detector circuit means coupled to said thyristor, oscillator and decoder means for sensing the change in current and voltage of said thyristor when said thyristor changes states such that, when a voltage of predetermined magnitude appears across said thyristor and said enabling signal is present, a trigger pulse is gated therethrough to said thyristor to switch it into its conductive state, said circuit being implemented on a single chip utilizing I$^2$L technology.

* * * * *